Patented June 2, 1942

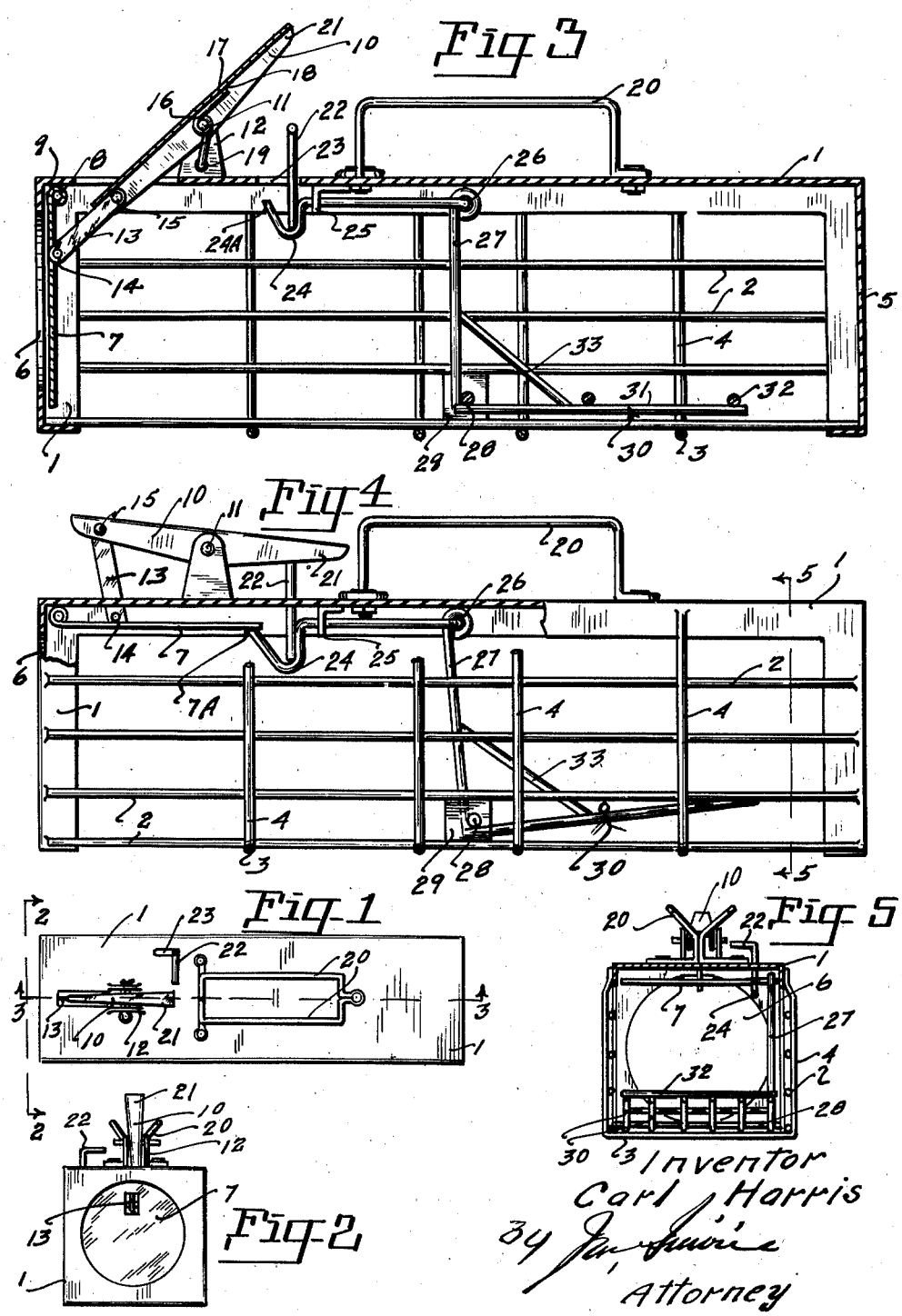

2,284,867

UNITED STATES PATENT OFFICE 2,284,867

ANIMAL TRAP

Carl Harris, Salem, Oreg.

Application May 5, 1941, Serial No. 391,963

6 Claims. (Cl. 43—61)

This invention relates to animal traps and is particularly adapted to be used for trapping mink on mink ranches and the like.

The primary object of the invention is to provide a trap that can be used as a set trap, and at the same time be used as a carrying cage in the transferring of animals from one place to another.

Another object of the invention is to provide a means of setting the trap, said means being located adjacent the carrying handle so that the trap door can be set without reaching inside of the trap to latch the same. This trap may be set by the thumb and forefinger of the hand carrying the trap, leaving the attendant's other hand free to perform other work relative to the handling of the animals.

A still further object of the invention is the provision of a trigger action that will release the trap door when the animal is well within the trap.

These and other incidental objects will be apparent in the drawing, specifications and claims.

Referring to the drawing:

Figure 1 is a plan view of the trap.

Figure 2 is an end view, taken on line 2—2 of Figure 1.

Figure 3 is a sectional side elevation of the trap, taken on line 3—3 of Figure 1, showing the trap having been sprung.

Figure 4 is a side elevation of the trap, partially broken away, illustrating the trap door in opened and set position.

Figure 5 is a sectional end view, taken on line 5—5 of Figure 4.

In the drawing:

The main body of the trap consists of a frame 1, to which the longitudinal side bars 2 are secured by any suitable means. Cross bars 3 and vertical bars 4 complete the cage-like body of the trap 1. One end of the trap is closed as at 5, the opposite end of the trap has an opening 6 for admitting the animal into the trap.

A trap door 7 is provided for closing the opening 6, and is pivotally mounted to the cross shaft 8, journaled to the frame at 9. The trap door is operated by the lever 10, which is pivotally mounted at 11 to the upright supports 12. The lever 10 is connected to the trap door 7 by the link 13, having one of its ends pivotally connected to the door at 14, and its opposite end connected to the lever 10 at 15. A spring 16 holds the lever 10 in the position shown in Figure 3, holding the trap door 7 closed, the end 17 of the spring bears against the lever at 18, and the opposite end is anchored to the upright 12 at 19.

The trap is carried by a suitable handle, and when this handle is grasped by the attendant he may use his thumb to press down the end 21 of the lever 10, bringing it to the position shown in Figure 4, raising the trap door 7 therewith.

An upright lever 22 extends up through the slot 23 of the frame 1 of the trap, its lower end is anchored to the trigger stop 24. The trigger stop 24 extends through a guide 25 terminating in a pivotal connection 26 to the pivotally mounted vertical lever 27. The lower end of the lever 27 is secured to the cross shaft 28, said cross shaft being pivotally mounted to the side frames 29. Extending horizontally from the cross bar 28 is a platform 30, consisting of parallel bars 31 connected together by the cross bars 32. The upright lever 27 is braced to the platform 30 by the brace 33.

When the animal comes through the opening 6 and walks on the platform 30, the vertical lever 27 is moved from the position shown in Figure 4 to that shown in Figure 3, or vice versa. When the operator presses the lever 10 down to set the trap, he uses his forefinger to move the upright lever 22 forward towards the trap door, which is being held in the position shown in Figure 4 by the thumb of the operator pressing down on the end 21 of the end 10, the end 24A of the trigger stop will come to bear under the trap door 7 at 7A. The tension of the spring 16 creates enough downward pressure at 7A by the trap door 7 to hold the platform 30 in the position shown in Figure 4, until the animal forces the same down by his weight, at which time the trigger 24 will release the trap door 7, allowing it to close.

While I have described the operation of the trap door and the lever 10 by the thumb of the operator and the manipulation of the trigger stop 24, by the forefinger of the operator against the upright lever 22, I do not wish to be limited to this manner of operation, as the mechanism illustrated can be handled in various ways.

The point that I wish to emphasize is that this trap can be set conveniently by the hand carrying the trap, and without having to reach into the trap to set any of the mechanism, which would be dangerous with certain kinds of animals.

I do not wish to be limited to the particular mechanism illustrated, as other forms of mechanical equivalents may be used to carry out the spirit of my invention, still coming within the scope of the claims.

What is claimed as new is:

1. An animal trap having a cage-like body, one end of the body having an animal entrance opening, a door for closing the opening, a lever mounted on the upper surface of the body and connected to the door, said lever being manually operable to raise the door to free the entrance opening, a stop within the body to underlie and support the door when the latter is in position to free the entrance opening, a platform in the body and connected to the stop to move the stop to free the door when the platform is subjected to the weight of the animal, the stop being manually operable to a position beenath the raised door for resetting the trap.

2. A construction as defined in claim 1, including a spring to exert pressure on the lever in door closing direction, said spring maintaining sufficient pressure on the free edge of the door when on the stop to prevent casual separation of the parts.

3. An animal trap having a cage-like body with an animal entrance opening at one end, a door for covering said entrance, a lever pivotally supported on the upper surface of the body, a connection between the lever and door to operate the latter in the movement of the former, a stop within the body to underlie the free edge of the door and support the door when in a position to free the entrance opening, means extending through the upper surface of the body to bodily move the stop to operative position for setting the trap, a platform in the body and movable under the weight of the animal, and a connection between the platform and stop to move the latter to an inoperative position relative to the door to release the door for closing the entrance opening, and means connected to the lever for compelling closing movement of the door when such door is free of the stop.

4. A construction as defined in claim 3, including a handle for the body, said handle being located immediately adjacent the free end of the lever and the means for moving the stop, whereby the finger and thumb of the hand grasping the handle may operate the lever and said means for resetting the trap.

5. A construction as defined in claim 3, wherein the body except for the entrance opening is of solid form at the top and ends, and wherein the sides and bottom are of skeleton form.

6. An animal trap, comprising a cage having an opening therein, a pivotally mounted trap door closure therefor, a set lever pivotally mounted to the top having a connecting link connected to one end, the opposite end of the connecting link being connected to the trap door, a trigger stop slidably mounted to the frame of the trap for engaging the trap door while in open position, a pivotally mounted platform connected to the trigger stop for releasing the same from the trap door when the platform is lowered by the animal.

CARL HARRIS.